US009001988B1

(12) United States Patent
Fitch

(10) Patent No.: US 9,001,988 B1
(45) Date of Patent: Apr. 7, 2015

(54) OPTIONAL SERVICES PROVISIONING SYSTEMS AND METHODS

(75) Inventor: Philip K. Fitch, Grapevine, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 3679 days.

(21) Appl. No.: 10/418,873

(22) Filed: Apr. 18, 2003

Related U.S. Application Data

(60) Provisional application No. 60/411,844, filed on Sep. 19, 2002.

(51) Int. Cl.
*H04M 3/42* (2006.01)
*H04M 3/487* (2006.01)

(52) U.S. Cl.
CPC .................................. *H04M 3/487* (2013.01)

(58) Field of Classification Search
USPC .......................... 379/201.01, 211.02, 212.01, 379/265.01–265.14, 266.01–266.1, 88.17, 379/207.02
See application file for complete search history.

(56) References Cited

U.S. PATENT DOCUMENTS

| 5,414,754 | A | * | 5/1995 | Pugh et al. ..................... 379/201 |
| 5,745,553 | A | * | 4/1998 | Mirville et al. ................. 379/67 |
| 5,933,484 | A | * | 8/1999 | Partridge, III ................ 379/201 |
| 6,272,215 | B1 | * | 8/2001 | Cockrell et al. .............. 379/219 |
| 6,658,093 | B1 | * | 12/2003 | Langseth et al. ........... 379/88.17 |
| 6,714,642 | B2 | * | 3/2004 | Dhir et al. ................ 379/265.02 |
| 2001/0012335 | A1 | * | 8/2001 | Kaufman et al. |
| 2002/0156661 | A1 | * | 10/2002 | Jones et al. |
| 2003/0161464 | A1 | * | 8/2003 | Rodriguez et al. |
| 2004/0008834 | A1 | * | 1/2004 | Bookstaff |
| 2004/0184593 | A1 | * | 9/2004 | Elsey et al. |

* cited by examiner

*Primary Examiner* — William Deane, Jr.

(57) ABSTRACT

A system and method can respond to a network user request for information by offering optional services to the user. The system and method can obtain the user request and determine a response to the user request. Based on user information available from the network and the determined response, the system and method can determine the optional services available to the user. The system and method can provide the user with a listing or menu of the optional services available for selection by the user. Once the user has made a selection, the system and method can transfer the user to a platform appropriate for delivery of the selected service.

8 Claims, 3 Drawing Sheets

OPTIONAL SERVICES PROVISIONING SYSTEMS AND METHODS

RELATED APPLICATIONS

This application claims priority to, and incorporates by reference, the entire disclosure of U.S. Provisional Patent Application No. 60/411,844, filed on Sep. 19, 2002.

FIELD OF THE INVENTION

The systems and methods of the present invention relate to communications networks, and more particularly to a system and method for offering optional services based on information obtained through a communication.

BACKGROUND

At present, network users may request information from network personnel during a communication, such as requesting a telephone number from an operator. The network personnel can determine which optional services the user may be eligible to receive based on the requested information, information provided by the user during the communication, user network capabilities, customer information from a network database and/or service availability. As one example, a telephone network, or system, user may request a telephone number for a restaurant from an operator. The operator can provide the user with an option (for a fee) to have the telephone system dial the number for the user.

In order to provide such optional services, the operator, or network personnel, can be required to look up the optional services that the user may be eligible for and to then communicate these services to the user. Such operator look ups and communications can be time consuming, inefficient and can also result in suggesting inappropriate services, or in neglecting to offer all services available to the user. There is a need to provide an automated system and method to determine the optional services to present to the user and to transfer the communication to the appropriate platform when the user chooses one or more of the optional services.

SUMMARY OF THE INVENTION

A method of providing optional services to a user of a network can include obtaining a request for information from the user, determining a response to the user request, determining user information, determining the optional services available to the user based on the user information and the response, presenting the available optional services to the user for selection and transferring the user to a platform appropriate for delivery of the selected optional services.

The response may be determined by obtaining information for the response from a database of response information. The optional services available to the user can be determined by matching user information to criteria for availability of optional services and by matching response data to a listing of optional services appropriate for the response. And, the optional services available to the user can be determined based on response data content and by matching user information to criteria for availability of the optional services and providing a menu item for an optional service when the user information matches the criteria for availability of the optional service.

The method can include routing the user request for information to a request processor to determine the response, transferring the user from the request processor to an optional services selector, determining, at the optional services selector, the optional services available to the user by matching the response to a table of categories of responses, where the categories can be associated with optional services available for the categories, and determining user eligibility for the optional services associated with the categories matching the response by matching the user information to eligibility criteria associated with the user information. The method can include determining preliminary user eligibility for optional services prior to transferring to the optional services selector, and completing communication with the user when the preliminary user eligibility indicates the user is not eligible for optional services.

In one embodiment, a method of providing optional services to a user of a network can include obtaining a response to a request for information by the user, determining available optional services based on matches between the response and a listing of categories of responses associated with optional services, determining a listing of optional services based on matches between the available optional services and a listing of optional services that the user is eligible to receive, providing the listing of optional services to the user, and transferring the user to service providers for the optional services that the user selects from the listing of optional services so as to provide to the user the optional services that the user selects. In another aspect, the method can provide the response to the user with the optional service. In another aspect, the method can determine the listing of optional services that the user is eligible to receive based on user information associated with a connection between the user and the network.

In another embodiment, a system for providing at least one optional service to a user requesting information from a network can include a processor to receive the request and access one or more databases that can include the information so as to obtain the information and to store the information in a system database, a services selector to compare the obtained information to categories in a table of response categories and optional services associated with the categories so as to determine optional services associated with the obtained information, the selector comparing the optional services associated with the obtained information to user eligibility criteria of user identification data so as to determine optional services available to the user, and a service provider platform to deliver the at least one optional service selected by the user from the optional services available to the user.

In one aspect, the system can include a routing means for connecting the user to the system and transferring the user between the processor, the services selector and the service provider platform. In another aspect, the user identification data can include a user identification database including eligibility criteria indexed by user number and, alternately or in combination, a user identification table of eligibility criteria and user numbers associated with the eligibility criteria.

In yet another aspect, the network can be a voice communication network, the routing means can be a Traffic Office Position System switch, the processor can be an operator workstation, and the service provider can be a concierge workstation. The system can include an announcement control process connected to the Traffic Office Position System switch to provide options to the user for selecting the at least one optional service and a voice feature node connected to the Traffic Office Position System switch to provide the obtained information to the user. The voice communication network can be a wireless communication network comprising a mobile telephone switching office for connecting the user to the system. An automated language selector can be connected to the Traffic Office Position System switch to provide language options for communicating with the user.

In yet another embodiment, a system for providing at least one optional service to a user of a network can include request processing means to obtain a response to a request for information by the user, selector means to determine a listing of optional services by comparing matches between the response and a category table including categories of responses associated with optional services, to matches between the user and a user table including user information associated with optional service eligibility criteria, provider means to provide the listing of optional services to the user, and to deliver to the user the at least one optional service that the user selects from the listing. In an aspect, the system can include a routing means to transfer the user between the request processing means, the selector means and the provider means.

In still yet another embodiment, a computer program for providing optional services to a user of a network can be disposed on a computer readable medium and can include instructions for causing a processor to obtain a user request for information, determine a response to the user request, determine user information, determine the optional services available to the user based on the user information and the response, present the optional services available to the user for selection by the user, and deliver the optional services upon selection of the optional services by the user. In an aspect, the instruction can cause a processor to compare matches between the response and a category table including categories of responses associated with optional services, to matches between the user and a user table including user information associated with optional service eligibility criteria. The instructions can cause a processor to provide the response to the user.

BRIEF DESCRIPTION OF THE DRAWINGS

The following figures depict certain illustrative embodiments in which like reference numerals refer to like elements. These depicted embodiments are to be understood as illustrative and not as limiting in any way.

DETAILED DESCRIPTION OF THE PREFERRED EMBODIMENTS

Figure 1:
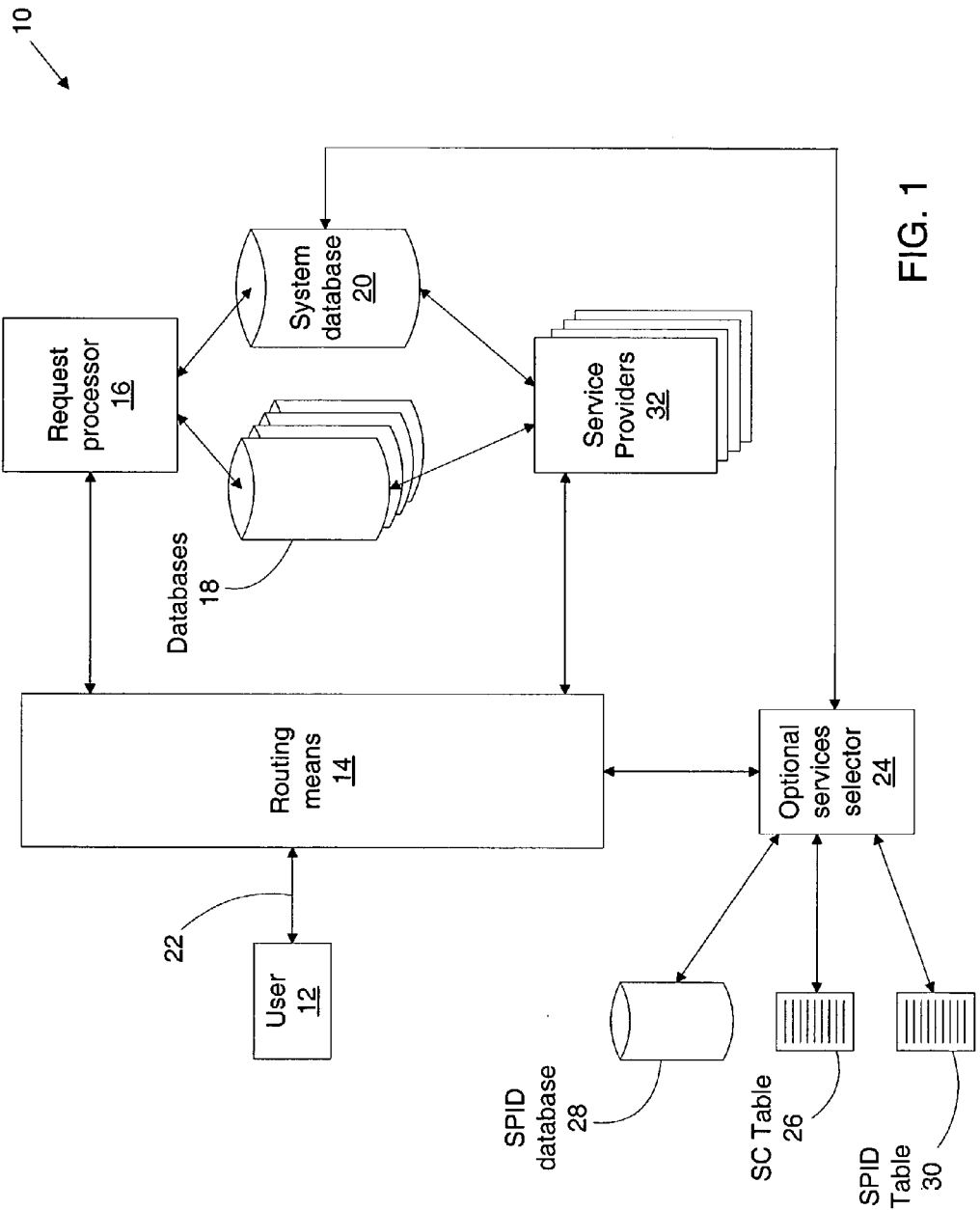
FIG. 1 shows a system for providing optional services.

Referring to FIG. 1, a schematic representation of a system 10 for providing optional services to a user of a communications network. A user 12 can access the system 10 to request information from the system 10. A switching or routing means 14 can route the user request to a request processor 16 that can obtain the requested information from a search of one or more databases 18 that may contain all or part of the requested information. If no information is available, request processor 16 can so inform the user 12. The communication with the user 12 can be completed, or the user can be transferred to another processor (not shown) for additional assistance. When all or part of the requested information is available, request processor 16 can store the obtained information in a system database 20. In addition, request processor 16 can also store user 12 identification information in system database 20. As is known in the art, such user identification information may be generally available from the network via the user connection 22. User information may also be obtained directly from the user, or through other user information databases, including databases 18, that request processor 16 may have access to and/or combinations of the above sources.

Once the obtained information and user identification information is stored in system database 20, the request processor 16 can transfer the user 12, including the user identification information, to the optional service selector 24. Using the identification information, the optional service selector 24 can perform a look-up in the system database 20 to retrieve the requested information obtained by request processor 16. It can be understood that the user identification information that request processor 16 may transfer to optional service selector 24 can include user identification information in the form of a user number that may also serve as an index for the obtained information and user identification information in system database 20. Optional service selector 24 can match the obtained information, or response data, to a service category (SC) table 26 to determine the optional services that can be provided for the obtained information. SC table 26 can include optional services data that the system 10 can maintain for response categories. As an example, SC table 26 can include listings of response categories and the optional services available for the categories.

The user identification information in system database 20 may also be used in determining user eligibility for the optional services that can be provided. The user information may include service provider identification data (SPID) that can include criteria to indicate which optional services the user 12 may be eligible for. Alternately, or in combination, optional service selector 24 can perform a look-up in a SPID database 28 using the user information, or optional service selector 24 can match the user information to eligibility criteria that may be included in a SPID table 30 to determine user 12 eligibility. The SPID database 28 and the SPID table 30 can include eligibility criteria that can be indexed by user information in the manner of system database 20. Optional service selector 24 may then provide the user 12 with a listing, or menu, of the optional services available for the obtained information and for which the user 12 may be eligible. In one embodiment, request processor 16 may perform a preliminary determination of user eligibility in the manner as described above and may simply provide the obtained information and complete the communication with the user 12 if the user 12 is not eligible for optional services.

The user 12 may select one or more of the optional services from the listing, or may select not to use the optional services. Once user 12 makes a selection, the optional service selector 24 can transfer the user to a platform appropriate for delivery of the selected optional service(s), which can include transferring to one or more service providers 32 that can provide the selected services to the user 12. It can be understood that once the optional services may be provided, or if no optional services are selected, the service provider(s) 32 can return the obtained information to the user 12 and complete the communication with the user 12. In the illustrative embodiment of FIG. 1, transfers among the request processor 16, the optional service selector 24 and the service provider(s) 32 may be facilitated through routing means 14. It can be understood that transfers may be made directly between the request processor 16, the optional service selector 24 and the service provider(s) 32, or the transfers can be facilitated through means other than routing means 14, and/or through some combination of the above.

Figure 2:
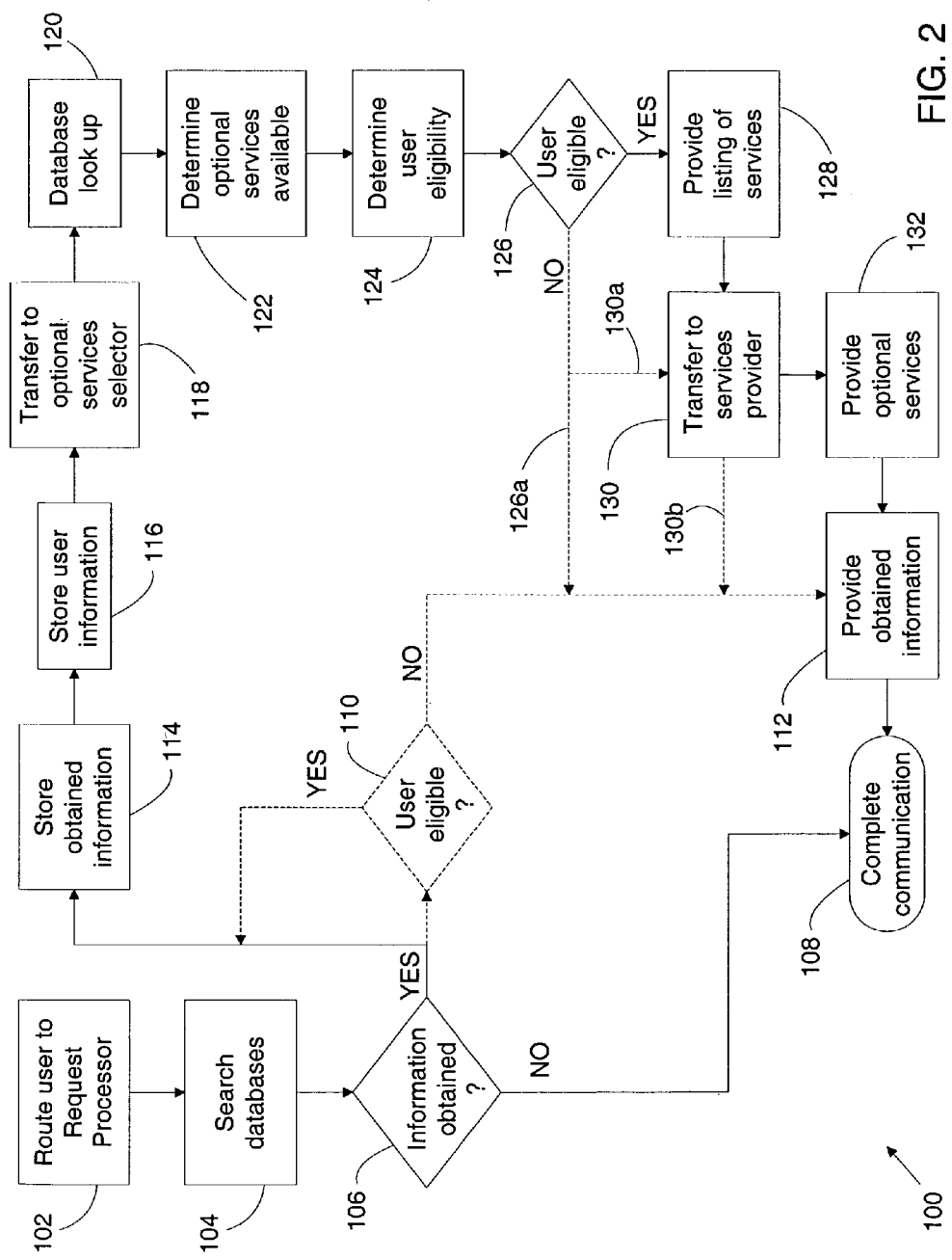
FIG. 2 shows a method of provisioning optional services.

Referring now to FIG. 2, there is illustrated a method 100 for offering and provisioning optional services to a system user. The user 12 may access the system 10 so as to request information from system 10. Upon requesting information from system 10, the user 12 can be routed (102) to request processor 16. Request processor 16 can search (104) databases 18 to obtain the requested information. If the requested information cannot be obtained, as determined at 106, the user 12 may be so informed and the communication with the user 12 can be completed or otherwise transferred so as to terminate method 100, as shown at 108.

When information is obtained, request processor 16 can optionally determine user eligibility for optional services, as indicated in phantom at 110. If the user 12 is not eligible for optional services, request processor 16 can provide the obtained information to the user (112) and complete the communication (108). When the user 12 is eligible, request processor 16 can store the obtained information in system database 20, as indicated at 114. Additionally, request processor 16 can store user information in system database 20, as indicated at 116. The user 12 can then be transferred to the optional service selector 24, as indicated at 118. Using user identification information as may be available through the user 12 connection 22 to system 10, or as provided by request processor 16, optional service selector 24 can perform a look-up of the obtained information in system database 20 at 120.

The obtained information can be matched against SC table 26, as at 122, to determine the optional services that may be available for the obtained information. Additionally, the optional services that user 12 may be eligible for can be determined at 124, as described previously with relation to optional service selector 24, system database 20, service profile database 28 and/or SPID table 30. As shown at decision block 126, if the user 12 is eligible for at least one optional service, optional service selector 24 may then, at 128, provide user 12 with a listing or menu of the optional services available for the obtained information and for which the user 12 may be eligible. Upon the user 12 making a selection, optional service selector 24 may transfer user 12 to one or more service providers 32, as shown at 130. Service provider (s) 32 can provide the selected optional service(s), as shown at 132, and/or can provide the obtained information to the user 12, as at 112 and complete the communication with the user 12, as at 108. As shown at decision block 126, if the user is not eligible for optional services, the service provider(s) 32 may directly provide the obtained information to the user 12, as indicated in phantom by arrows 130a and 130b, and complete the communication with the user 12, as at 108. Optionally, when the user is not eligible for optional services, optional service selector 24 may provide the obtained information to the user 12, as at 112 and complete the communication (108), as indicated in phantom by arrow 126a.

Figure 3:
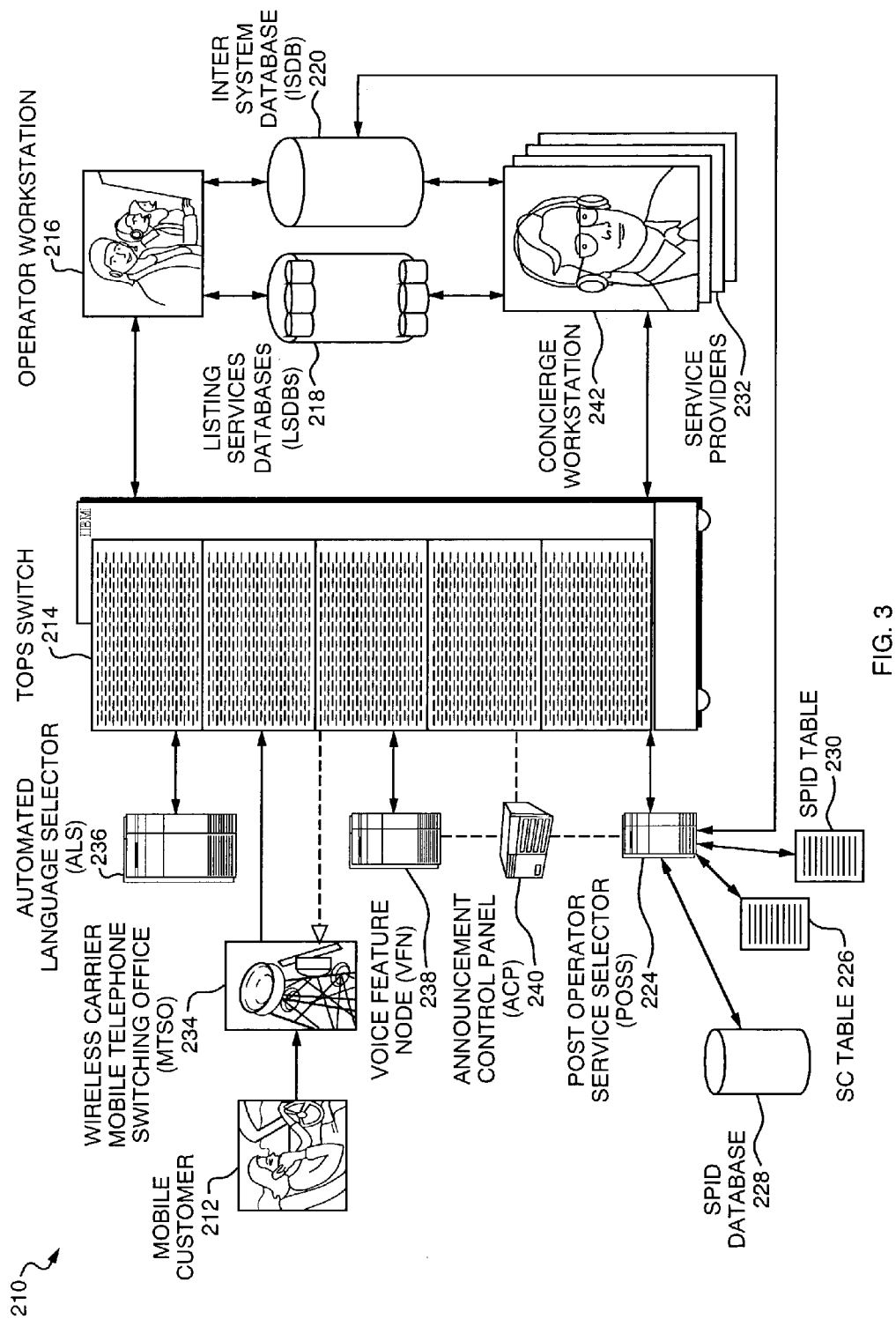
FIG. 3 shows an exemplary embodiment of the system of FIG. 1.

There may now be described an exemplary embodiment of the system 10 as may be configured for use in a mobile voice communications network. Reference numerals in FIG. 3 that differ by increments of 200 from those in FIG. 1 refer to similar parts in the different embodiments. Referring to FIG. 3, there is shown a system 210 for providing optional services to a user of a mobile voice communications network. It can be understood by those of skill in the art that the system 10 and method 100 can be adapted to other networks, including, but not limited to, land line voice communications networks, satellite networks, Internet, text messaging networks, wireless communications networks and other networks where a user may request information.

The user 212 can access the system 210 via a wireless carrier mobile telephone switching office (MTSO) 234 to request information from the system 210. For the exemplary embodiment of FIG. 3, the requested information may include a request for a telephone number. As may be known for such networks, an automated language selector (ALS) 236 can be invoked for the communication with the user 212 and a Traffic Office Position System (TOPS) switch 214 can route the user request to an operator workstation (OWS) 216 that can obtain the requested information from a search of a Listing Service Database (LSDB) 218. Based on the use of automatic number identification (ANI), trunk group and/or SPID for the user 212, as may be known for mobile voice communications networks, the OWS 216 may also determine user 212 eligibility for optional services.

If no information is available, or if OWS 216 determines the user 212 is not eligible for optional services, OWS 216 can "release" the user 212 to a voice feature node (VFN) 238, as may be known for facilitating the MTSO 234 return to complete the communication. The "release" can include the obtained information when the user 212 is not eligible for optional services. Otherwise, OWS 216 can transfer the user 212 to the post operator service selector (POSS) 224 and can write a record in the inter system database 220. The record can include the information obtained from the LSDB 218 and may include the user ANI, SPID and/or other user information obtained by the OWS 216. In the transfer, the POSS 224 can receive the user ANI and, using the ANI can perform a look-up in the inter system database 220 to retrieve the requested information obtained by OWS 216. POSS 224 can match the obtained information to SC table 226 to determine the optional services that can be provided for the obtained information. For the exemplary embodiment of FIG. 3, SC table 226 can include categories of responses and the optional services available for the categories.

POSS 224 may also determine user eligibility for the optional services that can be provided. POSS 224 may use the ANI, trunk group and/or SPID for the user 212, in the manner of the OWS 216. Alternately, or in combination, POSS 224 can perform a look-up in SPID database 228 using the user information, or POSS 224 can match the user information to a SPID table 230 to determine user 212 eligibility. POSS 224 may then provide the user 212 with a listing, or menu, of the optional services available for the obtained information and for which the user 212 may be eligible. In the embodiment of FIG. 3, an announcement control process (ACP) 240, as may be known for mobile communications networks, can be used to provide the options to the user 212. As an example of optional services that may be included among those available for the embodiment of FIG. 3, the following table is provided for a user 212 request of a phone number for a particular listing.

TABLE 1

| REQUESTED LISTING | OPTIONS PROVIDED TO USER 212 |
|---|---|
| Restaurant with qualifying address | "Please press or say 1 for Driving Directions, Reservations and other services or stay on the line to be connected" |
| Restaurant WITHOUT qualifying address | "Please press or say 1 for Reservations and other services or stay on the line to be connected" |
| Theater (movie or live), sports venue or other attraction with qualifying address | "Please press or say 1 for Driving Directions, tickets and other services or stay on the line to be connected" |
| Theater (movie or live), sports venue or other attraction WITHOUT qualifying address | "Please press or say 1 for tickets and other services or stay on the line to be connected" |

TABLE 1-continued

| REQUESTED LISTING | OPTIONS PROVIDED TO USER 212 |
|---|---|
| Other business or government listing with qualifying address | "Please press or say 1 for Driving Directions and other services or stay on the line to be connected" |
| Any other listing | "Please press or say 1 for additional assistance or stay on the line to be connected" |

It can be understood that listings and options may not be limited to those shown in Table 1 and additional listings and options may be available and provided to the user. As a further example, the options provided for a restaurant listing with a qualifying address may include: "Please press or say 1 for Driving Directions, press or say 2 for Reservations, press or say 3 for menu selections, press or say 4 for other services, or stay on the line to be connected." It can be seen from the above that SC table 226 can include response categories as may be shown in Table 1, i.e., restaurants, theatres, events, etc., and the optional services available for the categories, e.g., driving directions, reservations and menu selections for the restaurant category.

The user 212 may select one or more of the optional services from the listing, or may select not to use the optional services. Once user 212 makes a selection, the POSS 224 can transfer the user to one or more service providers 232 that can provide the selected services to the user 212. For the exemplary embodiment of FIG. 3 and Table 1, the user 212 may choose to press or say 1 and POSS 224 can transfer to a concierge workstation 242, which may be one of the service providers 232.

The systems and methods described herein may not be limited to a particular hardware or software configuration; they may find applicability in many communication environments. The techniques may be implemented in hardware or software, or a combination thereof. The systems and methods can be implemented in one or more computer programs executing on one or more programmable computers, such as may be exemplified by request processor 16, optional service selector 24, service providers 32, POSS 224, OWS 216 and/or concierge workstation 242, among others, that include a processor, a storage medium readable by the processor (including volatile and non-volatile memory and/or storage elements), one or more input devices, and one or more output devices.

The computer programs, or programs, may be preferably implemented using one or more high level procedural or object-oriented programming languages to communicate with a computer system; however, the program(s) can be implemented in assembly or machine language, if desired. The language can be compiled or interpreted. The computer program(s) can be preferably stored on a storage medium or device (e.g., CD-ROM, hard disk, or magnetic disk) readable by a general or special purpose programmable computer for configuring and operating the computer when the storage medium or device is read by the computer to perform the procedures described herein. The system can also be considered to be implemented as a computer-readable storage medium, configured with a computer program, where the storage medium so configured causes a computer to operate in a specific and predefined manner.

While the method and systems have been disclosed in connection with the preferred embodiments shown and described in detail, various modifications and improvements thereon will become readily apparent to those skilled in the art. As an example, those with ordinary skill in the art will recognize that the arrangement and connectivity of the components shown in the figures are merely for illustrative purposes, and can be varied accordingly and components may be combined or otherwise reconfigured without departing from the scope of the disclosed systems and methods. Accordingly, many additional changes in the details and arrangement of parts, herein described and illustrated, can be made by those skilled in the art. It will thus be understood that the following claims are not to be limited to the embodiments disclosed herein, can include practices otherwise than specifically described, and are to be interpreted as broadly as allowed under the law.

What is claimed is:

1. A system for providing at least one optional service to a user making a request for information from a network, comprising:
    a processor to receive the request,
    at least one database including the requested information, the processor accessing the at least one database to obtain the information,
    a system database for storing the obtained information,
    a services selector,
    a table of response categories and first optional services associated with the categories, the services selector comparing the obtained information to categories in the table to determine second optional services associated with the obtained information,
    user identification data, the services selector comparing the second option services associated with the obtained information to user eligibility criteria of the user identification data to determine third optional services available to the user, and
    at least one service provider platform to deliver the at least one optional service selected by the user from the third optional services available to the user.

2. The system of claim 1, comprising a routing means for connecting the user to the system and transferring the user between the processor, the services selector and the at least one service provider platform.

3. The system of claim 1, wherein the user identification data comprises at least one of a user identification database including eligibility criteria indexed by user number and a user identification table of eligibility criteria and user numbers associated with the eligibility criteria.

4. The system of claim 1, wherein:
    the network is a voice communication network,
    the routing means is a Traffic Office Position System switch,
    the processor is an operator workstation, and
    the at least one service provider is a concierge workstation.

5. The system of claim 4, comprising an announcement control process connected to the Traffic Office Position System switch to provide options to the user for selecting the at least one optional service.

6. The system of claim 5, comprising a voice feature node connected to the Traffic Office Position System switch to provide the obtained information to the user.

7. The system of claim 6, wherein the voice communication network is a wireless communication network comprising a mobile telephone switching office for connecting the user to the system.

8. The system of claim 7, comprising an automated language selector connected to the Traffic Office Position System switch to provide language options for communicating with the user.

* * * * *